B. F. MELTON.
Saddle Tree.

No. 201,934. Patented April 2, 1878.

WITNESSES:
C. Neveux
C. Sedgwick

INVENTOR:
B. F. Melton
BY Munn & Co.
ATTORNEYS.

UNITED STATES PATENT OFFICE.

BENJAMIN F. MELTON, OF GAINESVILLE, TEXAS.

IMPROVEMENT IN SADDLE-TREES.

Specification forming part of Letters Patent No. 201,934, dated April 2, 1878; application filed February 25, 1878.

*To all whom it may concern:*

Figure 1:
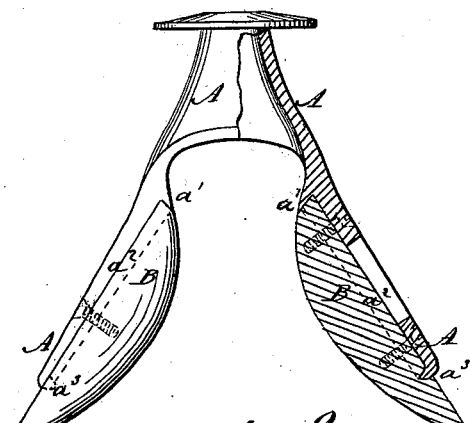
Figure 2:
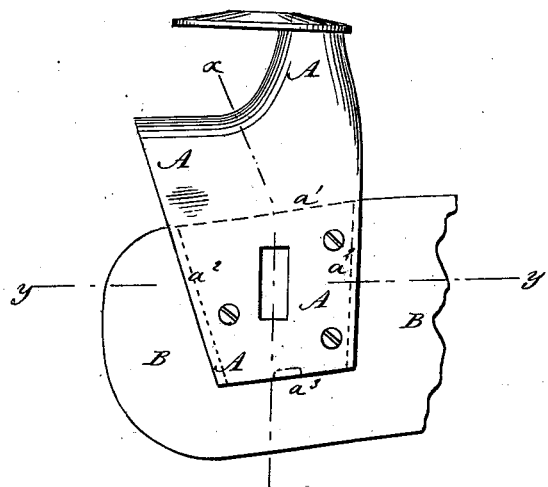
Figure 3:
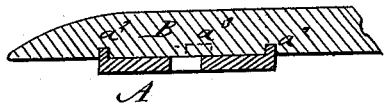

Be it known that I, BENJAMIN F. MELTON, of Gainesville, in the county of Cooke and State of Texas, have invented a new and useful Improvement in Saddle-Trees, of which the following is a specification:

Figure 1 is a front view of my improved saddle-tree, partly in section through the line $x$ $x$, Fig. 2, to show the construction. Fig. 2 is a side view of the same. Fig. 3 is a horizontal section of the same, taken through the line $y$ $y$, Fig. 2.

Similar letters of reference indicate corresponding parts.

The object of this invention is to improve the construction of saddles of the kind known as "Spanish" or "Texas" saddles, so as to make them simpler in construction, stronger, lighter, and more durable.

The invention consists in an improved saddle-tree, in which the arms of the pommel have lips formed upon the upper parts of their inner surfaces to receive the upper edges of the side bars, and inwardly-projecting flanges formed upon their side edges to fit into saw-kerfs in the outer surface of the said side bars, as hereinafter fully described.

A represents the fork or pommel of the saddle-tree, and B the side bars. The upper part of the inner sides of the arms or branches of the pommel A has a lip, $a^1$, formed upon it to receive the upper edge of the side bar B. Upon the side edges of the arms of the pommel A are formed inwardly-projecting flanges $a^2$, to fit into saw-kerfs formed in the outer surface of the side bars B. Upon the lower end of the arms of the pommel A of the saddle is formed a point, $a^3$, which is to be driven into the side bars B. The arms of the pommel A are secured to the side bars B by screws. The arms of the pommel A should be made with openings to receive the saddle-nails for securing the cover in place.

The pommel A may be made of steel, wrought-iron, or cast malleable iron, as may be desired.

The pommel is detached by taking out the screws, raising the ends of the arms of the said pommel until the flanges $a^2$ have been raised out of the kerfs of the side bars B, and then raising the pommel.

This improvement is applicable to all styles of Spanish and California saddles, muleys, &c.

Having thus described my invention, I claim as new and desire to secure by Letters Patent—

An improved saddle-tree, in which the arms of the pommel A have lips $a^1$ formed upon the upper parts of their inner surfaces to receive the upper edges of the side bars B, and inwardly-projecting flanges $a^2$ formed upon their side edges to fit into saw-kerfs in the outer surface of the said side bars B, substantially as herein shown and described.

BENJAMIN F. MELTON.

Witnesses:
J. P. DOSS,
P. B. STONER.